United States Patent [19]
Palma

[11] Patent Number: 5,915,743
[45] Date of Patent: Jun. 29, 1999

[54] METAL SPRAY TOOL REPAIR SYSTEM

[75] Inventor: Jay M. Palma, Pacific, Wash.

[73] Assignee: The Boeing Company, Seattle, Wash.

[21] Appl. No.: 08/884,878

[22] Filed: Jun. 30, 1997

[51] Int. Cl.$^6$ ..................................................... B23P 6/00
[52] U.S. Cl. ....................... 29/402.18; 29/527.4; 29/530; 427/142; 427/282
[58] Field of Search ........................... 29/402.18, 402.19, 29/402.17, 407.25, 527.2, 527.4, 530; 427/142, 448, 446, 8, 140, 456, 282; 219/76.14, 76.15, 76.16; 33/23.11

[56] References Cited

U.S. PATENT DOCUMENTS

| | | | |
|---|---|---|---|
| 5,105,551 | 4/1992 | McCutchen | 33/563 |
| 5,112,683 | 5/1992 | Johansen | 428/354 |
| 5,230,055 | 7/1993 | Katz | 395/750 |
| 5,731,030 | 3/1998 | Friese | 427/8 |

FOREIGN PATENT DOCUMENTS 327256  8/1989  Germany .

OTHER PUBLICATIONS

T.D. Fender, "Thermal Spray High Performance Polymer Coating," *Matrice Technology*, 11, pp. 16–20, (1996).

C.P. Howes, Jr., "An Overview of Thermal Spray Processes," *Matrice Technology*, 11.5, pp. 188–194, (1996).

Miller Thermal, Inc., "*Operator's Manual Model EASI™ 150 Arc Spray System*," Jul. 11, 1995.

*Primary Examiner*—P. W. Echols
*Assistant Examiner*—John Hong
*Attorney, Agent, or Firm*—Christensen O'Connor; Johnson & Kindness PLLC

[57] ABSTRACT

An under-dimensioned surface on metal tooling used in repetitive high temperature formation of parts is repaired by application of a metallic coating by use of a metal arc spray system. The under-dimensioned area is first roughened, and then is bordered by a raised template spaced a short distance above the surface of the tool by shims. Next the metal spray coating is applied, followed by machining of the metal coating to the proper dimensions of the tool.

20 Claims, 6 Drawing Sheets

METAL SPRAY TOOL REPAIR SYSTEM

FIELD OF THE INVENTION

The present invention relates to a system for repairing metal tooling, particularly metal tooling used repetitively for high temperature forming of parts of composite materials.

BACKGROUND OF THE INVENTION

Metal tooling or "tools" of the type with which the present invention is concerned are used during fabrication of parts, particularly parts of composite materials for aircraft. Such parts may be large or small, essentially flat or abruptly contoured, and structural or nonstructural. Examples are composite structural spars and ribs, large ducts, and interior panels. In each instance, the material to be formed is laid up on or otherwise applied to the metal tool, and then cured by application of heat or heat and pressure.

In the aircraft industry, tools of the type with which the present invention are concerned usually fall within one of the following categories:

(1) lay up mandrels for large composite parts, which can range from a few inches in length to 30 or 40 feet or more in length;

(2) compression mold dies;

(3) molds for vacuum forming; and (4) rotary molding tools.

Lay up mandrels and compression mold dies typically are subjected to temperatures of about 350° F. during fabrication of the part, and then are cooled down to approximately room temperature. Vacuum forming molds are subjected to temperatures of up to about 400° F. Rotary molding tools are subjected to temperatures of up to about 600° F. In each instance, the tools are cooled, preferably rapidly, for the next part forming operation. Such tools can sustain surface damage due to normal wear and tear, or abnormal surface damage during transport or while in service. More frequently, the tool may be fabricated with under-dimensioned surfaces, such as due to computer numerically controlled (CNC) machining errors.

In the past, repairs performed on under-dimensioned or damaged metal tools used materials such as epoxies and cement fillers, resulting in very short service life due to vast differences in material properties and the extreme temperatures, pressures, and operations to which the tools were subjected. Other repair techniques included weld filling, i.e., laying up weld beads followed by machining, which necessarily involves application of localized heat. This typically augmented the problem area as dimensional problems would crop up due to warping. Another known repair technique referred to as "tearing and salvaging" (removing large sections of the problem area and refabrication) may require securing a refabricated area or component to the remainder of the part by welding, and thereby introducing a new dimensional problem in the welded area.

Conventional rework methods often are not successful, and the tool must be scrapped.

SUMMARY OF THE INVENTION

The present invention provides a system for building up an undimensioned surface on metal tooling used in repetitive high temperature formation of parts. In general, the process includes application of a metallic coating by use of a metal arc spray system. The under-dimensioned area is first roughened, preferably by grit blasting. The under-dimensioned area then is bordered by a raised template, spaced a short distance above the surface of the tool by shims. Next, the metal spray coating is applied, followed by machining of the metal coating to the proper dimensions of the tool.

Many parameters affect the quality, durability, and appearance of the repaired tool. Among those are surface cleanliness and preparation, the match of metal spray material to tooling substrate material (which is not apparent without testing), proper masking, maintenance of proper temperatures during spraying, and post-coating machining techniques. Other factors affect these parameters. For example, maintaining an acceptably low temperature during metal spraying is affected by the type and pressure of the gas used for propelling the metal spray, the distance of the spray gun from the tool, and the applied power which results in producing the molten metal in the spray gun.

The specific procedures are described in detail below, but can be summarized as follows:

With respect to surface preparation, grit blasting is performed over the damaged area and an adjacent peripheral margin, sufficiently to bevel sharp or undercut corners or edges and provide a minimum depth for receiving the metal coating. Grit-resistant masking tape can be used, with the edge adjacent to the repair area spaced outward therefrom a predetermined distance.

Concerning matching of the metal spray material with the tooling substrate, it must be recognized that any spray coating material used will have physical and chemical characteristics which make them unavoidably different from the substrate they are sprayed on. For example, alloy composition, color match, thermal expansion, porosity, oxidation levels, etc., will be different. No matter how carefully the coatings are applied, residual stresses are introduced by the thermal spray process itself and thermal expansion at the coating-substrate interface when the coating is exposed to cyclic heating while in service. Through extensive experimentation, acceptable matches have been found for tooling substrates of high nickel steel (such as Invar 36), plain carbon steel (such as AISI 1008, 1018, 1020), electrodeposited pure nickel, aluminum alloy (specifically 6061), and brass. Nickel aluminide spray materials, particularly those containing molybdenum, have been found to perform well with high nickel steel and plain carbon steel, and also have been found to bond well in thin layers for electrodeposited pure nickel, aluminum alloy 6061, and brass. In the case was found to perform well in thicknesses up to 0.030 inch, and could be used for thicker applications if a thin (0.001–0.002 inch) coating of nickel aluminide is used. For aluminum alloy 6061, aluminum-silicon, aluminum-bronze and silicon-bronze metal spray performed well up to thicknesses of about 0.030 inch, and for thicker applications if preceded by a thin coating of nickel aluminide. Repair of brass tooling substrates was achieved by use of an aluminum-silicon, silicon-bronze or aluminum-bronze coating, again for thicknesses up to about 0.030 inch and in thicker applications if a thin primer coating of nickel aluminide is applied at the substrate interface.

Concerning masking, spacing of a mask or template from the surface of the substrate was found to be important. Otherwise, the coating often tended to break or crack as the mask material was removed.

Concerning temperature, it was found that high localized temperatures that could cause warpage or other dimensional problems could be avoided by appropriate spacing of the spray gun from the surface being coated, by selection of the propellant gas (argon is preferred in many applications), and by monitoring the temperature of the substrate adjacent to the area under repair, such as by a thermocouple.

Important aspects of machining include selection of the cutting tool material and cutter geometry to avoid particle pull out and/or coating flake out. Depth of cut (axially or radially) and feed and speed also can affect the integrity of the coating.

These and other aspects of the present invention are described in detail below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a system for repairing under-dimensioned areas of metal tools, particularly tools used for forming parts and subjected to thermal cycling during part formation. Examples of such tools are lay up mandrels, compression mold dies, vacuum forming molds, and rotomolding dies. Still more specifically, the present invention is concerned with repairing under-dimensioned areas of such tools which must meet strict tolerances such that the tools cannot be used if parts of them are underdimensioned by a few thousandths of an inch. Because of the extreme conditions to which the tools are subjected, repair by use of epoxy and cement fillers has not been successful. Filling by welding has introduced localized heating sufficient that additional, uncorrectable, dimensional problems arise, such as warping. The technique of "tearing and salvaging" (i.e., removing large areas or components and substituting a refabricated piece) may be expensive and impractical, particularly if welding still is required, which has the problems noted above.

In investigating solutions to the problem of metal tooling repair, experiments were conducted with known "metal spraying" or "thermal spraying" systems. Plasma thermal spraying techniques were found to introduce unacceptable high local heating and therefore were inappropriate. Similarly, thermal spraying by combustion processes resulted in unacceptably high local thermal gradients which could damage the tooling being repaired. Initially, it was thought that thermal spraying by electric arc wire systems would similarly introduce unacceptably high localized thermal gradients. After all, the arc wire technique involves producing molten metal and spraying atomized droplets of the molten metal onto a substrate. However, it has been discovered that at least for certain substrates with certain metal wires, thermal spraying by arc wire systems, combined with careful surface preparation, masking, spraying techniques and finishing, can often solve the problem of repair of underdimensioned metal tools and therefore result in tremendous cost savings by prolonging the life of the metal tools or allowing misfabricated tools to be repaired.

Figure 1:
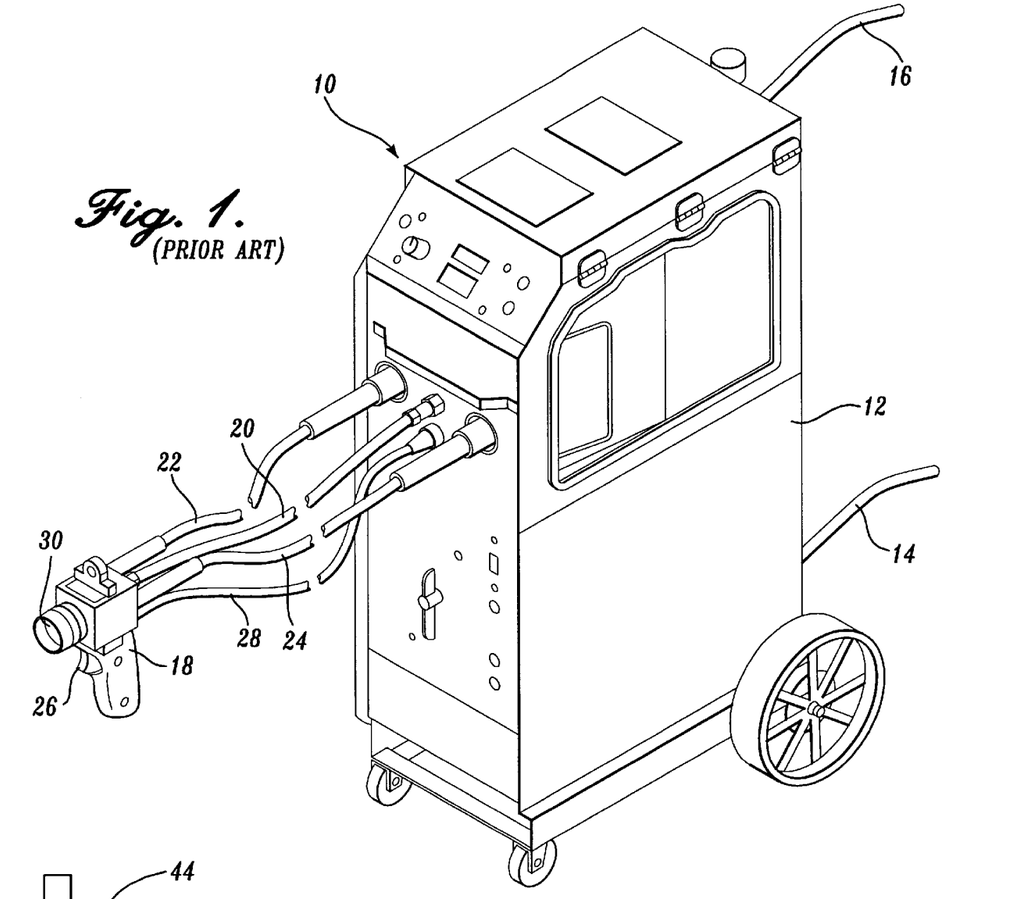
FIG. 1 is a top perspective of a conventional metal arc spray system.
Figure 2:
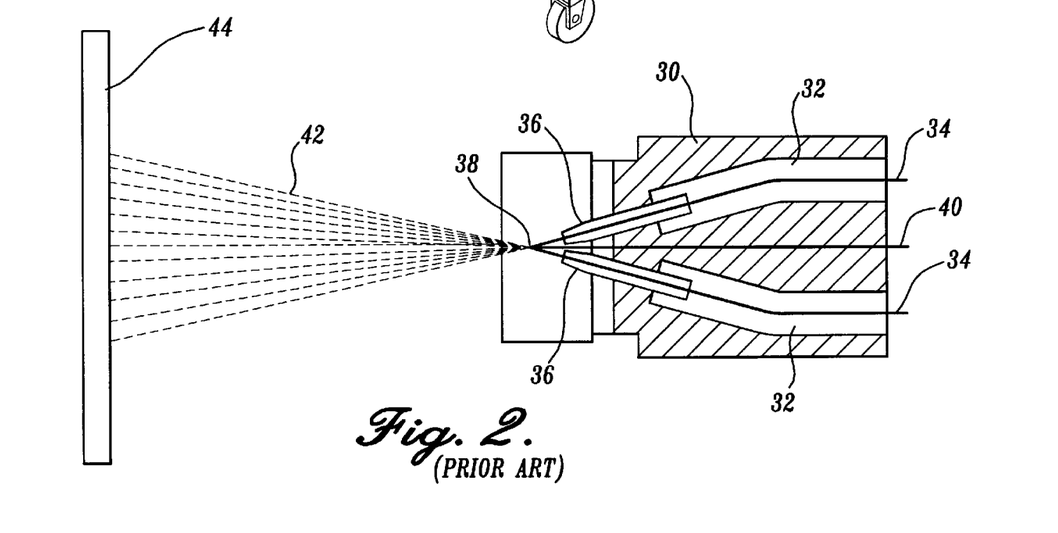
FIG. 2 is a somewhat diagrammatic sectional view of a component of such system in use, namely, the metal spray gun.

FIG. 1 and FIG. 2 illustrate a representative electric arc wire metal spraying system 10 of a type that can be used in the present invention. Such a system includes a cabinet 12 containing the electronic and wire-feeding components of the system. The electronic components receive external power by way of a power cord 14, and air under pressure is fed to the system by way of an inlet conduit 16. The compressed air is fed to a spray gun 18 by a hose 20. Electrified metal wires are fed to the spray gun through conduits 22 and 24. The spray gun has a trigger 26, the position of which is conveyed to the components in the cabinet by way of a control cable 28. In general, when trigger 26 is depressed, atomized molten metal droplets are ejected by a nozzle 30 of the spray gun 18.

More specifically, with reference to FIG. 2, the spray gun nozzle 30 has conduits 32 connected to the wire conveying cables 22 and 24 (FIG. 1). Wires 34 from separate spools in the cabinet are fed at a predetermined rate and are maintained at a predetermined electrical potential relative to each other. Conduits 32 including insulating tips 36 direct the electrified wires toward each other. The wires arc and melt at the location 38 where they contact each other, in direct alignment with the compressed air stream 40. Such stream atomizes the molten metal into a fine spray 42 of metal droplets which, ideally, solidify on the desired substrate 44.

A representative electric arc wire system usable in the present invention is the "Model EASI 150 Arc Spray System—Part No. 5006257" available from Miller Thermal, Inc. of Appleton, Wis. Such system is designed for use with a variety of metal wires as described in the Operator's Manual for that system. The wires differ in chemical composition, melting point, and weight (i.e., density, which can be expressed as pounds per cubic inch as well as pounds per linear foot for a typical 14 gage wire). For each wire there is a recommended operating range for voltage, amperage, air pressure, wire feed rate, and spray rate (i.e., travel speed of the gun over flat workpieces).

Experimentation leading to discovery of the present invention involved the use of test plates of tool substrate materials desired to be repaired. For example, in the case of aluminum alloy 6061, a plate 8 inches wide by 15 inches long and one-half inch thick had one broad surface prepared by milling a groove one inch wide and 0.030 inch deep along the entire length of one broad surface of the plate. The artificially created underdimensioned portion then was prepared as described in detail below for reception of a metal spray from the electric arc wire system. If the metal coating bonded well, it was finished by careful milling and grinding to produce a "repaired" plate. Sometimes close visual examination would reveal unacceptable defects such as excess porosity, cracks or voids. If the test plate passed visual inspection, it then was subjected to thermal cycling of a type at least as severe as could be expected in normal service. For example, in the case of rotary molds which are repetitively subjected to heat of 600° F. for 15 minutes followed by rapid water spray quench while in service, an aluminum plate of 6061 alloy one-half inch thick and representative of the type of material used for fabricating these types of tools was metal sprayed as described in detail below and subjected to ten cycles of 600° F. for 16 minutes, with a cold-water quench between each cycle. Thereafter, hardness tests were performed in the area of the repair and an adjacent unrepaired area of the plate to assure that the finished, coated, repaired area had a hardness not significantly greater or lower than the unrepaired area. A greater hardness would increase the potential for failure of the coating during processing due to increased difficulty in machining and finishing (blending out). A lower hardness, while facilitating machining and hand finishing, would render the coating weak (not bonding strongly enough to withstand long term thermal cycling), and not hard enough to withstand the abrasive wear which these tools experience in normal use. Similarly, testing was conducted for other common tooling substrate materials, namely high nickel steel (Invar 36), low alloy steels (AISI 1008, 1018 and 1020), electrodeposited nickel, and brass in order to simulate specific in service conditions. In each instance it was discovered that tools of these materials subjected to thermal cycling during part formation could have underdimensioned surface defects repaired, subject to the constraints discussed in detail below.

General Limitations

As discussed briefly above, all of the spray coating materials used in the present invention necessarily have physical and chemical characteristics which make them unavoidably different from any of the substrates they are sprayed on, e.g., alloy composition, color match, thermal expansion, porosity, oxidation levels, etc. Understanding these differences is important in explaining why thermal metal spray coatings do not behave in the same manner as the substrates to which they are applied, and is important for selecting the "best" coating-substrate match for any application.

As described above, initially the electric arc wire process produces molten metal in the spray gun. However, much of the heat is lost during the atomization process, but enough heat must be retained in the atomized metal droplets to ensure adequate bonding of at least 80% of the particles upon contact with the relatively cooled substrate. Metal particles that have lost too much heat ("nonbonding" particles) simply bounce off the substrate and either eject rapidly or become trapped under the oncoming stream of hot droplets. The coatings rely primarily on substrate asperity (surface roughness) for adhesion to the substrate. Thus, surface preparation and cleanliness are important.

Additionally, thermal sprayed coatings are inherently porous due to trapped nonbonding particles. Five percent to ten percent porosity is typical for electrical arc sprayed coatings. For this reason, tooling requiring vacuum integrity should be sealed with an appropriate sealer after finishing for optimum results. The particular sealers selected will depend on the application.

Each of the spray coatings of the present invention has been tested to at least 400° F. Thermal cycles exceeding this temperature range may result in reduced coating life, depending upon thickness and area coverage.

Further, thermal spray coatings by the system of the present invention have relatively low impact resistance (low toughness). They may not withstand sudden, concentrated forces, e.g., pounding with a hammer, steel stamping, etc.

While there are no known limits for size of a repair in terms of total surface area coverage or geometric configuration, coatings are recommended to a thickness of 0.100 inch or less, although thicker coatings may be successful in particular applications. Thicker coatings risk failure by cracking and/or spalling at the coating-substrate interface due to residual stresses introduced by the thermal spray process itself and thermal expansion at the coating-substrate interface when the coating is exposed to cyclic heating while in service.

Surface Preparation

Coarsening or roughening of the surface is required. A suction-type grit blaster equipped with continuous grit recovery is preferred, such as the "QB-Quick Blaster™" model available from Clements National Co. Other grit-blasting systems with similar characteristics may be used.

It is important that only filtered air (i.e., no oil or water) be used for operating the grit-blast equipment. To prevent inadvertent or accidental contamination, labeling and installing of non-standard fittings is recommended so that the equipment is not used in other processes.

Surface cleanliness is crucial. The procedure should be started by degreasing and/or cleaning the repair area thoroughly using suitable cleaners and/or solvents to remove oil, dust, and other contaminants which may be present on the repair surface.

Figure 3:
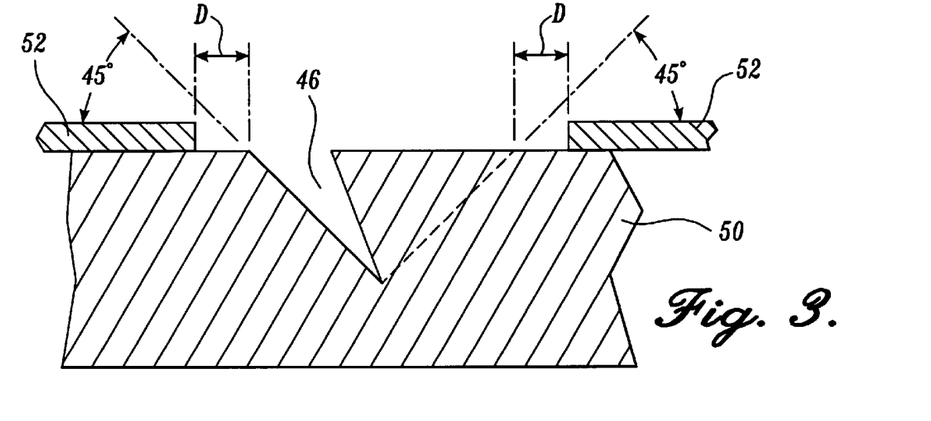
FIG. 3, FIG. 4, and FIG. 5, are corresponding vertical sections of a metal tooling substrate having a surface flaw to be repaired in accordance with the system of the present invention.
Figure 4:
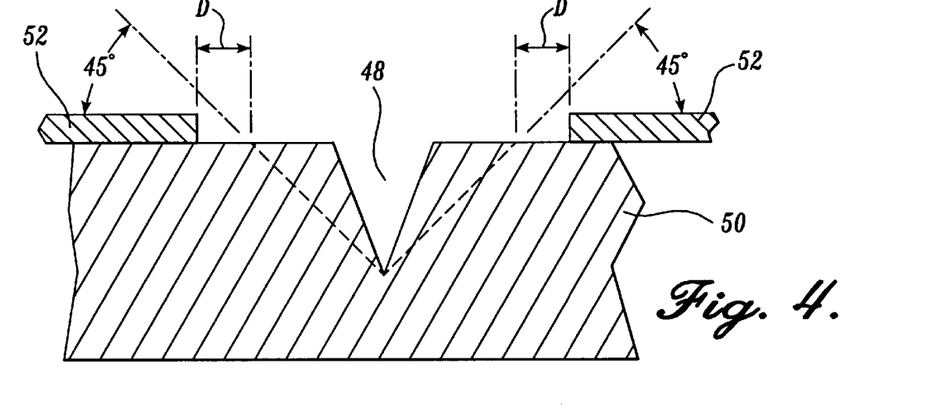

Direct "line of sight" is required for bonding of the thermal spray. With reference to FIG. 3 and FIG. 4 (in which dimensions are exaggerated for ease of illustration), undercut areas 46 or narrow, sharply angled areas 48 in the tooling substrate 50 preferably are beveled to an angle of at least 45°, to provide easier penetration of the metal spray.

Figure 5:
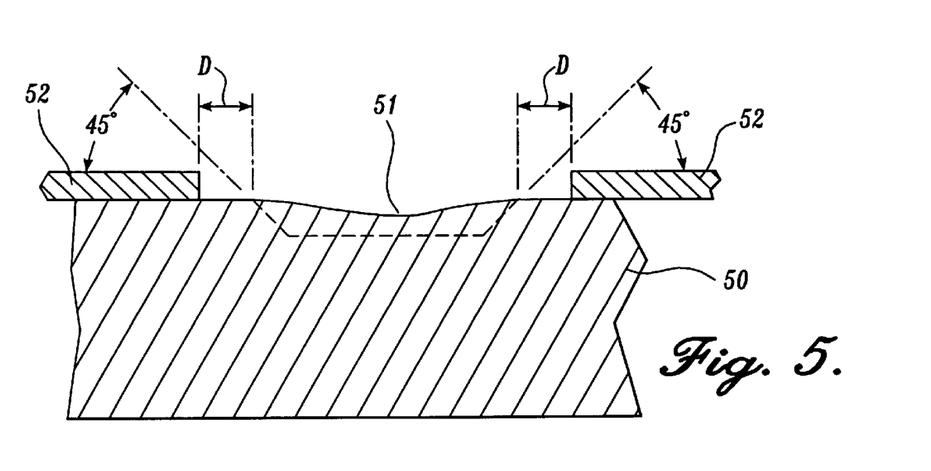

If the original repair surface is not smooth enough to facilitate cleaning with solvents, such as if it contains numerous fine scratches, "blend-out machining" may be necessary. The broken lines in FIG. 5 illustrate such a blend-out area 51. Blend-outs may be as shallow as 0.010 inch and as deep as 0.100 inch. When forming a blend-out, care should be taken to taper off the edge at an approximate angle of 45 degrees.

As discussed further below, it is desirable to extend the perimeter (outer edge) of the deposited coating beyond the intended repair surface such that an excess strip of one-eighth to one-quarter inch wide surrounds the entire repair. This additional surface area is needed for anchoring the edge of the coating to the substrate, and for providing a smooth transition (feathering) of the coating into the surrounding substrate during finishing operations. Nevertheless, it is undesirable to unnecessarily roughen the undamaged surface of the tooling substrate. Thus, the repair area can be surrounded by grit-resistant, polyurethane masking tape 52 having its inner edge spaced outward a predetermined distance D from the area requiring repair, such as one-eighth to one-quarter inch.

Complex curved shapes can be simplified into approximate squares or rectangles in order to simplify masking and later machining of the sprayed coating. Again, an additional one-eighth to one-quarter inch strip should be exposed to grit blasting beyond the main body of the repair. Areas away from the repair surface and beyond the polyurethane tape can be protected as needed from over-spray or "fly away" grit particles by covering with plastic sheets, duck tape, etc. and/or disposable baffles. A preferred mixture is one part 16-mesh grit to one part 24-mesh grit. If this mixture is too heavy for the grit blaster to propel, a grit mixture containing one-third of 16-mesh, one-third of 24-mesh, and one-third of 36-mesh can be used; or a mixture containing one part 24-mesh to one part 36-mesh grit. In all cases, aluminum oxide grit is preferred at a pressure of approximately 100 psi. The grit-blaster gun should be held approximately one to two inches away from the repair surface and should be held perpendicular to the workpiece (tool substrate). The gun should be swept slowly until a uniform, dull matte finish is visible across the entire repair surface.

Broken grit and dust residue remaining on the freshly blasted surface should be removed by blowing off with a continuous blast of filtered air. During this operation, the air nozzle preferably is held at close range (approximately one-eighth inch) but without touching the surface. The grit-blasted surface then should be inspected visually, and any grit particles which still remain embedded into the base metal can be removed using a clean, sharp instrument.

Cleanliness is extremely important; the exposed blasted surface should not be touched with bare hands, dirty gloves, etc.

Thermal Spraying

Figure 6:
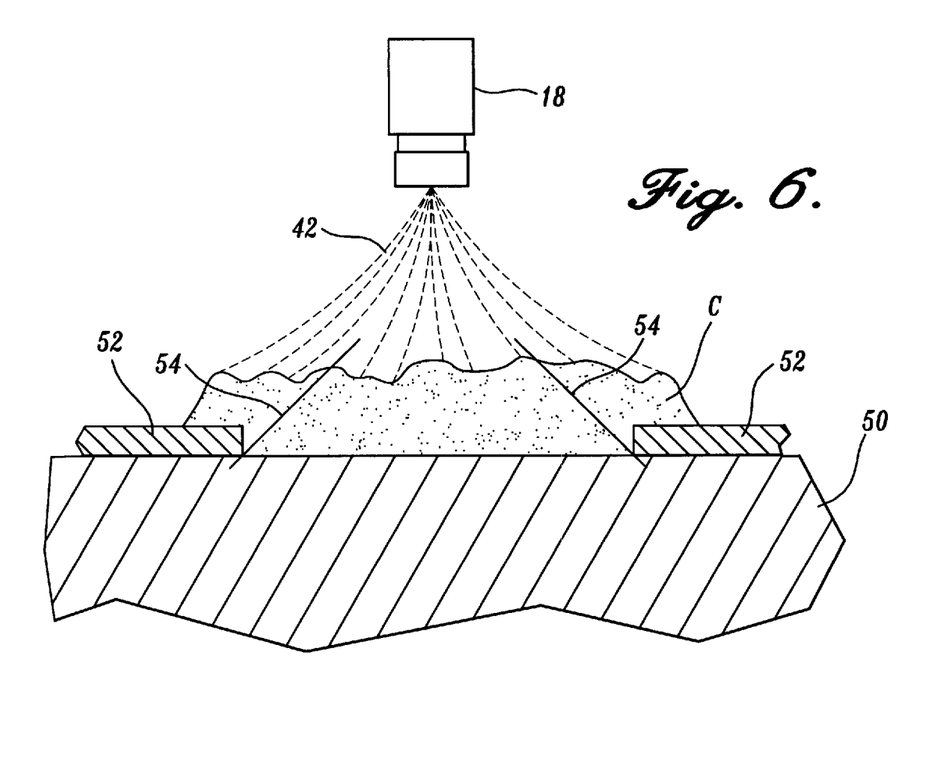
FIG. 6 is a diagrammatic side elevation of a metal tooling substrate during depositing of a metal spray coating over an area masked by tape.

With reference to FIG. 6, for early experiments the grit/temperature resistant tape 52 was left in place while the metal spray 42 from the spray gun 18 was swept across the repair area to deposit the coating C. The coating invariably would extend over the inner edge portions of the tape 52. Often, the coating would crack inward as represented by lines 54 in FIG. 6. It is believed that this occurred by leverage of the unanchored marginal portion of the coating being pried upward as the tape was removed. Additionally, it is believed that metal particles would bounce or reflect inward from the inner upright edge of the tape, increasing the number of non-bonding particles along the periphery of the repair. Considerable effort in solving the tool repair problem was wasted due to these effects.

Figure 7:
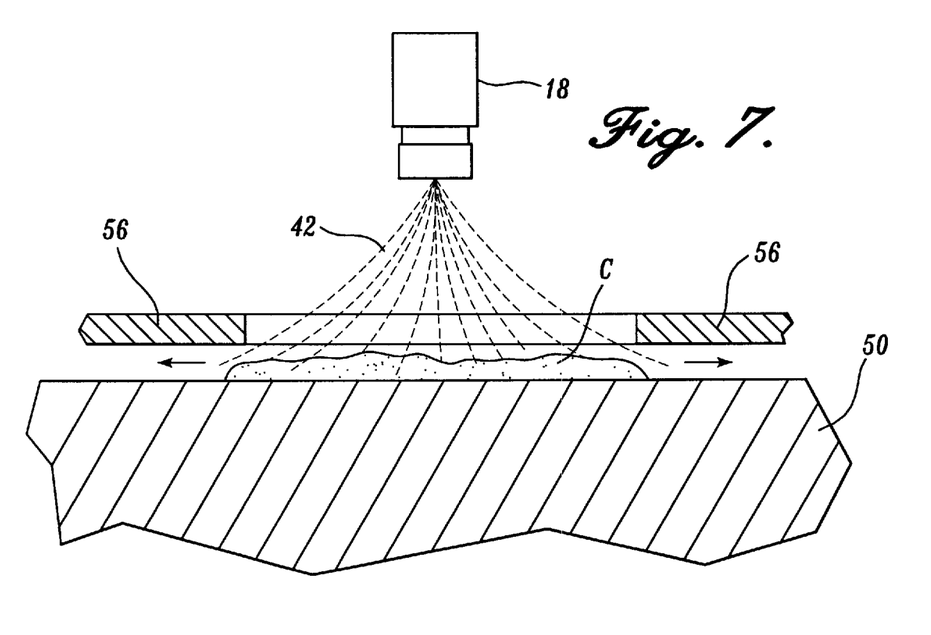
FIG. 7 is a corresponding side elevation illustrating depositing of a metal spray coating over an area having a raised template.

With reference to FIG. 7, it was discovered that the repair could be effectively achieved if an elevated metal template 56 were used to mask the repair area. By spacing the metal template 56 above the surface of the tooling substrate 50, particle bounce back was eliminated or at least greatly lessened. Additionally, since the template or mask 56 is metal, it works effectively as a heat shield and heat sink, and allows free flow (flushing) of nonbonding particles and fluid propellant away from the repair site. This assists in maintaining the repair site at the required low temperature, and permits longer spraying times between cool-down periods (discussed below).

Figure 8:
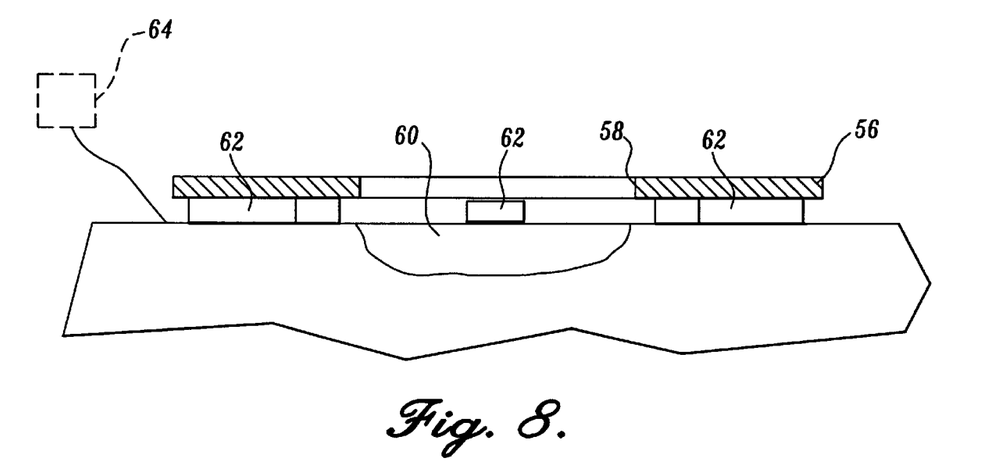
FIG. 8 is a top plan of a metal tooling substrate to be repaired, with a template in accordance with FIG. 7 in place.
Figure 9:
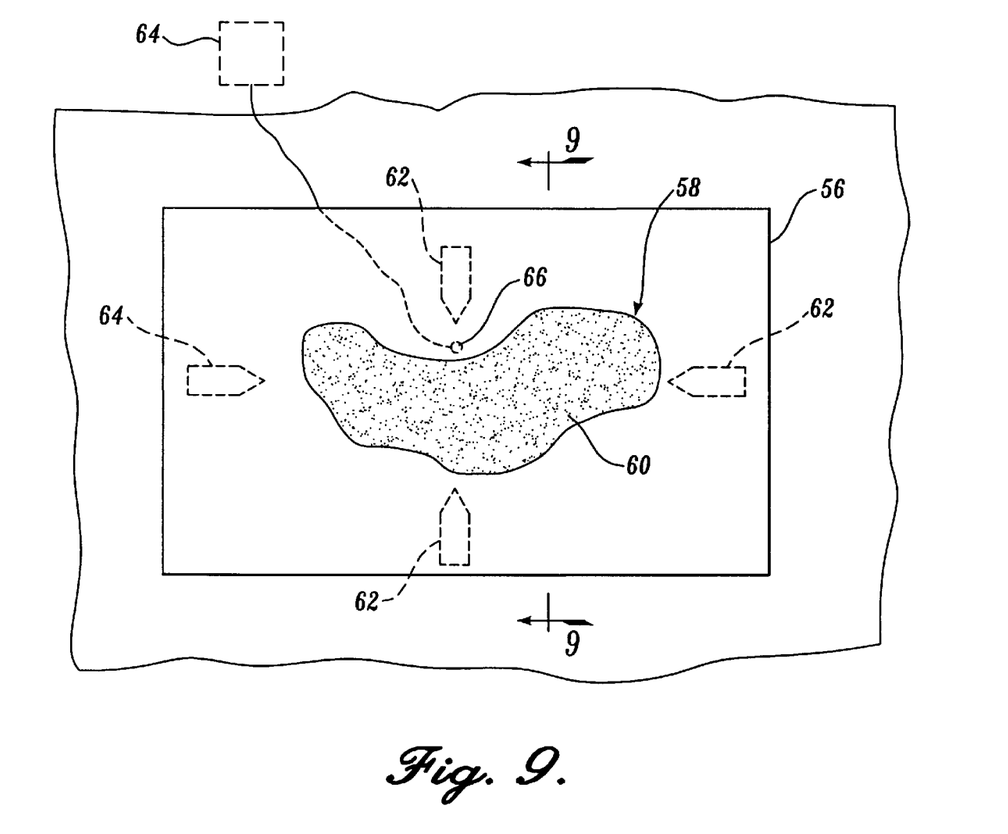
FIG. 9 is a section along line 9—9 of FIG. 8.

More specifically, FIG. 8 and FIG. 9 illustrate the preferred masking. Template 56 is a thin metal sheet (0.062–0.125 inch thick) having an opening 58 of a size slightly greater than the repair area 60. The template can be spaced above the surface of the tooling substrate by shims 62. Preferably, the shims are spaced apart sufficiently so as not to unduly interfere with free flow of propellant fluid and unbonded particles between the underside of the template and the surface of the tooling substrate. Additionally, the periphery of the edge of the template opening 58 still should be spaced outward slightly from the periphery of the repair area 60.

It is preferred that the temperature of the tooling substrate be monitored during the spraying process. A suitable digital thermometer 64 and thermocouple 66 can be used. For large repair areas, it is preferred that one thermocouple be provided for every two linear feet of the repair area. An appropriate digital thermometer is the "Tri-Sense™" Model H-37000-00 available from Cole Parmer Instrument Co. Teflon tape is recommended for taping of the thermocouple wire tips to the substrate. The thermocouple tips can also be taped to the back of the substrate if there is no room for them in front provided that the substrate is no thicker than about one-half inch. In that case, preferably the thermocouple is placed directly behind the repair area for optimum temperature monitoring accuracy.

Preferably the repair surface area is measured along several points using a magnetic base, dial indicator, and/or other precision instrument (while ensuring that the surface is not touched with anything but the clean point of the measuring probe). This will establish a "zero-reference" plane as a guide to determine approximately how much spray material is needed to fill the depression to the desired level.

When depositing the metal spray over the repaired area, the spray gun should be held at an angle of 90° from the workpiece, and should be traversed smoothly and uniformly. An approximate traverse speed of 2–3 feet per second is recommended as a preliminary guide, but arm speed may be adjusted depending on the size, shape, and depth of the repair. Gun dwelling should be avoided as this results in uneven, lumpy deposits and excessive localized heat. The temperature meter should be observed almost constantly, and a preferred temperature range of 75° F.–100° F. maintained during spraying. If the substrate is cooler than 70°, it should be warmed prior to spraying. Spraying should be stopped as the temperature approaches 100° F., and the substrate allowed to cool by blowing repeated blasts of filtered air directly over the coating and workpiece. Spraying can be resumed when the temperature has decreased to approximately 80° F. The coating thickness can be measured periodically to determine how much material has been deposited and/or how much more material needs to be sprayed. Coating build-up should be continued to at least 0.010 inch above the desired finished surface.

Higher temperatures may be permissible, up to about 125° F. The primary consideration is not to reach a temperature at which problems are introduced by localized heating. At higher temperatures there is an increased risk of residual stresses caused by thermal gradients, possibly reducing the life of the coating.

The first of four metal spray materials used successfully in tool repairing applications was one which contained a variation of a spray material known as "nickel aluminide". Nickel aluminide is the typical and generic term given to all metal spray alloys containing about 80%–96% nickel and about 4%–20% aluminum. This unique alloy generates an exothermic reaction when the alloy is heated to its liquid temperature. When the material is sprayed on a relatively cold substrate, the molten droplets solidify instantly, but the additional heat generated during the exothermic reaction makes the coating attain a "pseudo" metallurgical bond at the coating-substrate interface. The net result is a coating of considerable strength, with excellent corrosion and high temperature resistance, and excellent finishing (machining, grinding, sanding, polishing) properties.

One such nickel aluminide metal spray material is sold under the trademark A.I. 1800 by Miller Thermal, Inc. of Appleton, Wis., having the following composition:

Nickel: 84.8%–89.5%

Aluminum: 5.5%–7.0%

Molybdenum: 5.0%–6.5%

Other Elements: 1.7% maximum

Extensive testing has shown that a coating of this material is compatible with all of the following tooling substrate types in terms of coefficients of thermal expansions:

High Nickel Steel (Invar 36)

Plain Carbon Steel (e.g., AISI 1008, 1018, 1020)

Electrodeposited Pure Nickel

Aluminum Alloy 6061

Brass

For high nickel steel and plain carbon steel, the nickel aluminide material also results in a coating that closely matches the metallurgical properties of the substrate (i.e., color match, hardness, and appearance), but not with electrodeposited pure nickel, aluminum alloy 6061, and brass. Nevertheless, a thin layer 0.001–0.002 inch deep is all that is required to take advantage of the exothermic reaction and consequent high bond strength at the interface. For electrodeposited pure nickel, aluminum alloy 6061 and brass, the remainder of the repair can be sprayed with a filler material that more closely matches the metallurgical properties of the substrate, but which is not exothermic, as discussed below.

It was found during spray tests of the preferred nickel aluminide material that "in flight" spray particle oxidation can be minimized by switching from air to an inert gas, Argon gas (welding grade) being preferred. This is believed to shroud the spray metal from the available oxygen in the air. Argon gas sprayed coatings were found to be a definite improvement on high nickel steel (Invar 36) and plain carbon steel. When compared to air-sprayed coatings they produced the following results consistently:

- decreased hardness which produced a better match to that of the substrate;
- improved machinability;
- improved toughness (higher resistance to failure by cracking/flaking after deformation tests);
- improved cosmetic appearance.

A particularly striking color match is achieved with Invar 36 when Argon gas propellant is used.

Preferred settings for the A.I. 1800™ spray wire are: 70 amperes and 29 volts (both adjustable as required to produce a smooth arc); 60–70 psi propellant gas pressure; spray distance of 4–6 inches (air propellant) or 2–4 inches (Argon propellant). The shorter spray distance when used in Argon propellant is due to the fact that the atomized metal particles appear to cool faster in Argon than in air.

A second nickel aluminide spray wire material found to be effective for repair of high nickel steel and plain carbon steel is "NKL-ALM 95/5™" spray wire produced by Miller Thermal, Inc. and having the following composition:

| Nickel | 94% |
|---|---|
| Aluminum | 4% |
| Silicon | 1% |
| Titanium | 1% |

Spray distances and operating gas pressures are the same as given above for the A.I. 1800™ spray wire, but smooth arcing was found to be achieved at a setting of 100 amps and 30 volts. This material provides a particularly good color match on plain carbon steels, less so on high nickel steels.

For electroformed nickel, pure nickel spray wire (98.9% minimum nickel content) provides good bond strength and excellent color match when sprayed to a maximum thickness of 0.030 inch. Greater thicknesses require a thin (0.001–0.002 inch) coating of nickel aluminide. Preferred operating parameters for the pure nickel spray wire are: 150 amps and 27 volts (adjusted as required to produce a smooth arc); 55–60 psi operating gas pressure; spray distance of 5–6 inches for air and 3–4 inches for Argon.

Similarly, aluminum alloy 6061 and brass substrates require a thin primer or bond coat of nickel aluminide for satisfactory results for thicknesses greater than about 0.030 inch. At lesser thicknesses, and for filler over the thin primer or bond coat when greater thicknesses are required, aluminum-silicon spray wire has been found to be successful in tooling substrate repair, particularly spray wire having the following chemical composition:

| Aluminum: | 92.3% minimum |
|---|---|
| Silicon: | 4.5%–6.0% |
| Other Elements: | 1.7% maximum |

Such a material is sold under the trademark "ALM-S" by Miller Thermal, Inc. Preferred spray parameters are: 55 amperes and 34 volts (adjusted to produce a smooth arc); 55–60 psi gas pressure (air); spray distance of 4–5 inches. This spray wire also worked effectively for brass substrates with identical parameters and conditions.

Aluminum-bronze spray wire also was found effective for repair of aluminum alloy 6061 and brass substrates for thicknesses up to 0.030 inch (greater thicknesses require a primer or bond coat of nickel aluminide at the substrate boundary), particularly spray wire having the following composition:

| Copper | 88% minimum |
|---|---|
| Aluminum | 9.0%–10.0% |
| Iron | 0.7%–1.3% |
| Impurities | 0.5% maximum |

Such a spray wire is sold under the trademark AL-BRZ™ by Miller Thermal, Inc. Preferred operating parameters are: 100 amperes and 30 volts (adjusted to produce smooth arc); 55–60 psi operating gas pressure (air); 6–7 inches spray distance.

Finally, silicon-bronze spray wire was found to effectively repair aluminum alloy 6061 and brass substrates when used in accordance with this disclosure, particularly spray wire having the following composition:

| Copper | 94% maximum |
|---|---|
| Silicon | 2.8%–3.8% |
| Manganese | 0.5%–1.3% |

Such a spray wire is sold under the trademark "SIL-BRZ" by Miller Thermal, Inc. A primer or bond coat of nickel aluminide is required for repairs greater than 0.030 inch deep. Preferred operating parameters are: 70 amperes and 32 volts (adjusted to produce a smooth arc); 55–60 psi operating gas pressure (air); spray distance of 4–5 inches.

The ALM-S™ spray wire offers excellent color match on aluminum alloy 6061 substrate. Bronze coatings (AL-BRZ™ and SIL-BRZ™) produce a light "copper" tone.

Finishing

Finishing processes including milling, grinding, drilling, sanding, and polishing. Heat input from any of these finishing operations must be kept to a minimum. For example, if milling or grinding, flood coolant or cold air should be used whenever possible to maintain both the coating and substrate cool. In general, the coating should feel comfortable to the hand touch at any time during hand grinding or sanding operations.

Preferably, the thermal spray coatings are machined with tungsten carbide type tools in order to minimize the risk of particle pull out (tearing), or other detrimental conditions which can lead to unacceptable surface finish. Preferred cutter geometry is as follows:

| | |
|---|---|
| Radial Rake | −2° to −5° |
| Axial Rake (Helix) | 20° |
| Relief | 25° |
| Lead | 0° to 45° |

Depth of cut should not exceed 0.015 inch (axially or radially) per pass. Special care should be taken at the edges of the coating to assure that the coating is not lifted up or pulled away during the final stages of feathering out.

On surfaces requiring vacuum integrity, or long-term protection of the spray coating against oxidation, a clear, air drying phenolic varnish sealer can be used, such as that sold under the trademark "METCOSEAL-AP" by Seltzer-Metco Inc. of Downey, Calif.

Cost Savings

Figure 10:
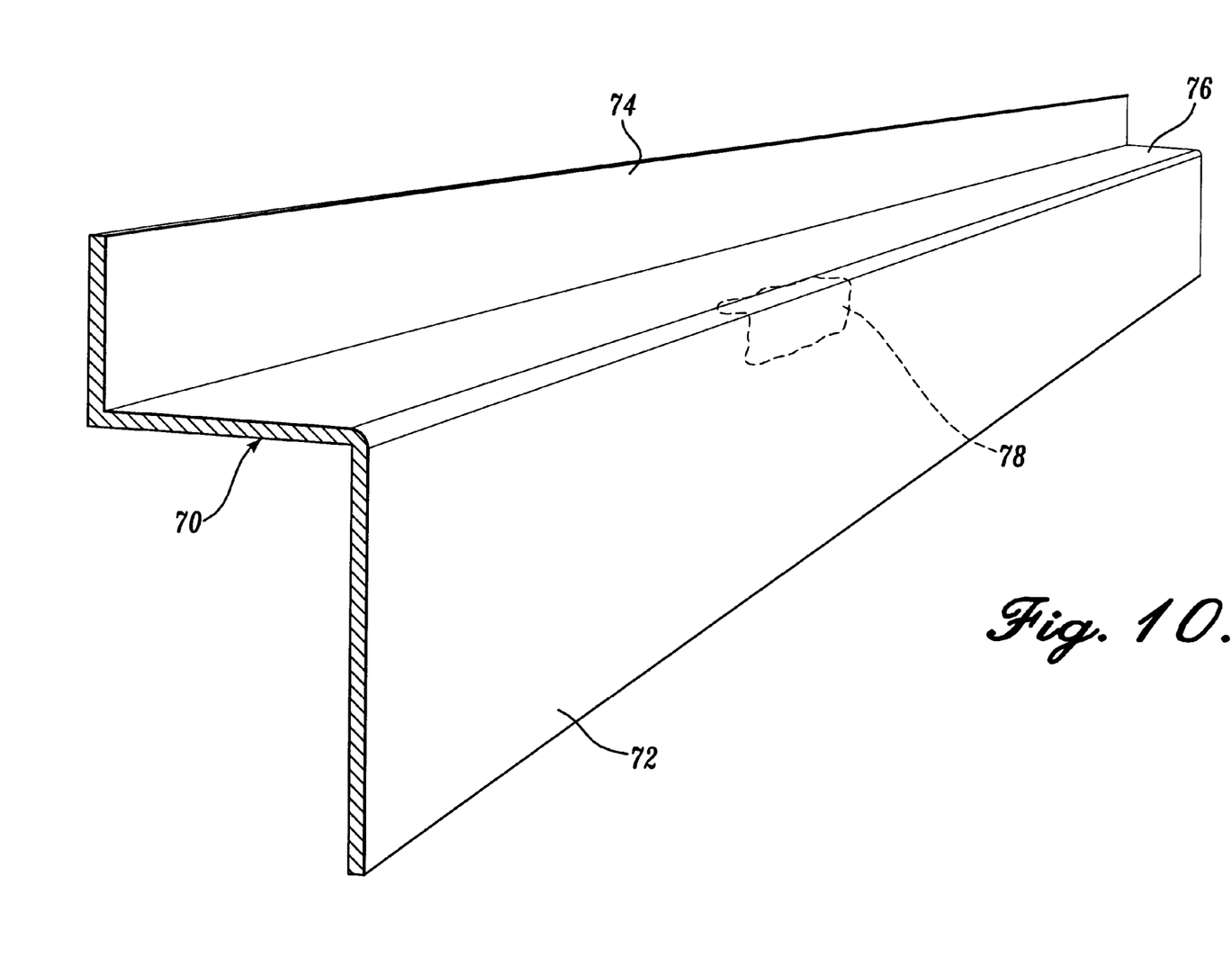
FIG. 10 is a fragmentary perspective of a metal tool having an underdimensioned area to be repaired.
Figure 11:
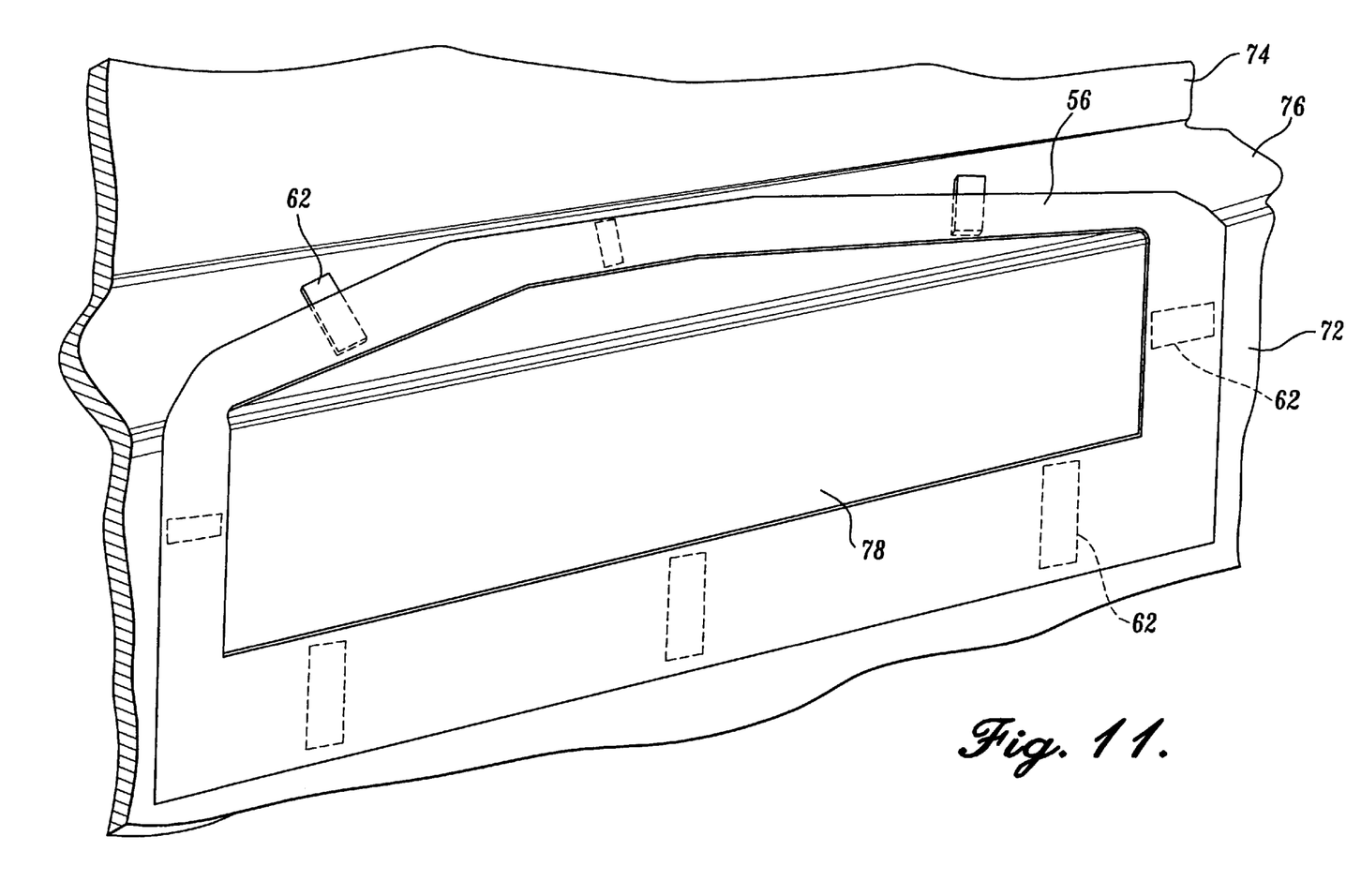
FIG. 11 is an enlarged perspective of such area prepared for repairing in accordance with the system of the present invention.

FIG. 10 illustrates somewhat diagrammatically a lay up mandrel 70 for a wing rib spar of a Boeing 777 aircraft. Such mandrel is formed of high nickel steel (Invar 36) of a thickness of ½ inch, with a front, bottom wall 72 approximately 2 feet high, rear, top wall 74 approximately 12 inches high, and web or bench 76 approximately 7 inches wide. Typically, the overall length of the mandrel is in excess of 30 feet. Estimated labor to fabricate the mandrel is in excess of 1,000 hours. Broken lines 78 indicate an underdimensioned area in the newly fabricated mandrel encompassing approximately 3 feet by 6 inches of the front wall 72 and an adjacent area of the web 76 extending inward approximately 5 inches. Measurements revealed that area 78 was underdimensioned from 0.004 to a maximum depth of 0.072 inch. Prior to the present invention, there was no known manner of repairing the tool so that it could be placed in service. FIG. 11 illustrates the template 56 with shims 62 applied around the repair area 78 prior to repair by metal spray as discussed above with nickel aluminide. Total labor time for the repair was about 16 hours, including surface preparation, masking, metal spray, and finishing, for a total estimated cost of repair of $1,600 including materials. The mandrel was successfully placed in service following the repair, with no observed adverse consequences.

Similar results have been obtained for a variety of other types of tools subjected to cyclic thermal processes during part formation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. The method of repairing an under-dimensioned area of a tool used in part forming and subjected to thermal cycling during part formation, which method comprises:
   (a) roughening the under-dimensioned area, and roughening a peripheral marginal portion surrounding the under-dimensioned area;
   (b) masking the under-dimensioned area by applying a raised template having an opening sized to surround the under-dimensioned area which template is spaced above the adjacent surface of the tool so that the template defines an open passage along the adjacent surface of the tool for free flow of a metal spray propellant between the template and the adjacent surface of the tool;
   (c) applying a coating on the roughened and masked under-dimensioned area with a metal spray from a metal electric arc wire spray system; and
   (d) finishing the coating to the proper dimensions of the tool.

2. The method defined in claim 1, in which the opening of the template is larger than the under-dimensioned area so as to form an exposed peripheral marginal portion of the tool surrounding the under-dimensioned area.

3. The method defined in claim 1, in which the template is heat conductive for acting as a heat sink.

4. The method defined in claim 1, including performing step (c) by: (i) monitoring the temperature of the tool adjacent to the under-dimensioned area while applying the coating with the metal spray; (ii) suspending application of the coating if the temperature approaches or reaches a predetermined temperature; and (iii) resuming application of the coating after the temperature has dropped substantially below the predetermined temperature; until the coating is built up to a thickness greater than the proper dimensions of the tool.

5. The method defined in claim 4, in which the predetermined temperature is 100° F.

6. The method defined in claim 4, in which the predetermined temperature is 125° F.

7. The method defined in claim 1, in which the tool is steel and the metal spray is nickel aluminide.

8. The method defined in claim 1, in which the tool is formed of high nickel steel and the metal spray is nickel aluminide.

9. The method defined in claim 1, in which the tool is plain carbon steel and the metal spray is nickel aluminide.

10. The method defined in claim 1, in which the tool is electrodeposited pure nickel and the metal spray is neat nickel.

11. The method defined in claim 1, in which the tool is aluminum alloy and the metal spray is an aluminum-silicon composition.

12. The method defined in claim 1, in which the tool is aluminum alloy and the metal spray is an aluminum-bronze composition.

13. The method defined in claim 1, in which the tool is aluminum alloy and the metal spray is a silicon-bronze composition.

14. The method defined in claim 1, in which the tool is brass and the metal spray is an aluminum-silicon composition.

15. The method defined in claim 1, in which the tool is brass and the metal spray is a silicon-bronze composition.

16. The method defined in claim 1, in which the tool is brass and the metal spray is an aluminum-bronze composition.

17. The method defined in claim 1, in which the tool is aluminum alloy, and, in step (c), applying the coating by first applying a thin coating of nickel aluminide metal spray followed by applying a coating of a different metal spray material.

18. The method defined in claim 17, in which the different metal spray material is an aluminum-silicon composition.

19. The method defined in claim 17, in which the different metal spray material is an aluminum-bronze composition.

20. The method defined in claim 17, in which the different metal spray material is a silicon-bronze composition.

* * * * *